(12) United States Patent
Liang et al.

(10) Patent No.: US 10,084,985 B2
(45) Date of Patent: Sep. 25, 2018

(54) DISPLAY DEVICE AND MAINBOARD APPLIED IN THE DISPLAY DEVICE

(71) Applicant: Beijing Xiaomi Mobile Software Co., Ltd., Beijing (CN)

(72) Inventors: Xin Liang, Beijing (CN); Xing Yan, Beijing (CN); Yingguan Shi, Beijing (CN); Jianhua Li, Beijing (CN); Yukun Fei, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/599,976

(22) Filed: May 19, 2017

(65) Prior Publication Data

US 2018/0035070 A1 Feb. 1, 2018

Related U.S. Application Data

(63) Continuation of application No. PCT/CN2016/091703, filed on Jul. 26, 2016.

(51) Int. Cl.
*H04N 5/14* (2006.01)
*H04N 5/445* (2011.01)
(Continued)

(52) U.S. Cl.
CPC ............ *H04N 5/445* (2013.01); *H04N 5/04* (2013.01); *H04N 5/4401* (2013.01); *H04N 5/63* (2013.01)

(58) Field of Classification Search
CPC .......... H04N 5/445; H04N 5/04; H04N 5/441; H04N 5/63
(Continued)

(56) References Cited

U.S. PATENT DOCUMENTS 5,630,174 A * 5/1997 Stone, III .................. G06F 3/14
345/520
6,618,781 B1 9/2003 Liauw et al.
(Continued)

FOREIGN PATENT DOCUMENTS

CN 103123516 A 5/2013
CN 203931460 U 11/2014
(Continued)

OTHER PUBLICATIONS

International Search Report in International Application No. PCT/CN2016/091703, dated Apr. 28, 2017.
Extended European Search Report for European Patent Application No. 17166185.3, dated Oct. 19, 2017.

*Primary Examiner* — Michael Lee
(74) *Attorney, Agent, or Firm* — Finnegan, Henderson, Farabow, Garrett & Dunner LLP (57) ABSTRACT

A display device includes: a display panel; a mainboard including a processing circuit, a signal transmission interface, and a signal conversion interface, wherein the signal conversion interface includes a first interface and a second interface, and the signal transmission interface is electrically connected to a signal transmission interface of the display panel; and an adaptation circuit electrically connected to the signal conversion interface, the first interface of the signal conversion interface being electrically connected to the processing circuit of the mainboard and the second interface of the signal conversion interface being electrically connected to the signal transmission interface of the mainboard.

9 Claims, 6 Drawing Sheets

(51) Int. Cl.
*H04N 5/04* (2006.01)
*H04N 5/44* (2011.01)
*H04N 5/63* (2006.01)

(58) Field of Classification Search
USPC .......................................................... 348/571
See application file for complete search history.

(56) References Cited

U.S. PATENT DOCUMENTS

| | | | |
|---|---|---|---|
| 2002/0021669 A1* | 2/2002 | Kunito | H04L 67/2823 370/235 |
| 2005/0200413 A1 | 9/2005 | Fujimori et al. | |
| 2006/0242669 A1* | 10/2006 | Wogsberg | H04N 7/01 725/74 |
| 2007/0052372 A1* | 3/2007 | Ryu | H05B 41/2853 315/291 |
| 2011/0072473 A1* | 3/2011 | Funabiki | H04N 21/43637 725/81 |
| 2013/0174042 A1 | 7/2013 | Kim et al. | |
| 2014/0379951 A1* | 12/2014 | Taki | G06F 13/4068 710/303 |
| 2015/0042879 A1 | 2/2015 | Chiang et al. | |

FOREIGN PATENT DOCUMENTS

| | | |
|---|---|---|
| CN | 205016216 U | 2/2016 |
| CN | 105702187 A | 6/2016 |

* cited by examiner

DISPLAY DEVICE AND MAINBOARD APPLIED IN THE DISPLAY DEVICE

CROSS REFERENCE TO RELATED APPLICATION

This application is based on and claims priority to International Patent Application No. PCT/CN2016/091703, filed Jul. 26, 2016, which is incorporated herein by reference in its entirety.

TECHNICAL FIELD

The present disclosure relates to the field of display technology, and more particularly, to a display device and a mainboard applied in the display device.

BACKGROUND

In the production of televisions, manufacturers will release various different types of televisions to satisfy the requirements of different consumers, for example, using different sizes, appearances, display panels, etc. From the perspective of large-scale production, if there are many types of televisions, reducing the number of types of mainboards with the highest circuit complexity as much as possible will help to enhance the efficiency of production, sales, after-sales and maintenance services, and also quality control.

However, it may be difficult to use a uniform type of mainboards for televisions using different display panels. As for traditional display panels produced by various panel manufacturers, although connecting lines between signal transmission interfaces of the display panels and signal transmission interfaces of the mainboards are standard, signal properties such as line order definition, control interface, signal level polarity and the like are not unified, and the various panel manufacturers may not be willing to unify these signal properties considering their own benefits. Developing a specific mainboard separately for each type of display panel may increase the development cost significantly. Also, it may be hard to produce these mainboards in a same production line, which brings negative effects on production process control, inventory management, spare-parts management and maintenance, etc.

SUMMARY

According to a first aspect of the present disclosure, there is provided a display device, comprising: a display panel; a mainboard including a processing circuit, a signal transmission interface, and a signal conversion interface, wherein the signal conversion interface includes a first interface and a second interface, and the signal transmission interface is electrically connected to a signal transmission interface of the display panel; and an adaptation circuit electrically connected to the signal conversion interface, the first interface of the signal conversion interface being electrically connected to the processing circuit of the mainboard and the second interface of the signal conversion interface being electrically connected to the signal transmission interface of the mainboard.

According to a second aspect of the present disclosure, there is provided a mainboard applied in a display device, comprising: a processing circuit; a signal transmission interface; and a signal conversion interface, wherein the signal conversion interface includes a first interface and a second interface.

It is to be understood that both the forgoing general descriptions and the following detailed descriptions are exemplary and explanatory only, and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to example embodiments, examples of which are illustrated in the accompanying drawings. The following description refers to the accompanying drawings in which same numbers in different drawings represent same or similar elements unless otherwise described. The implementations set forth in the following description of example embodiments do not represent all implementations consistent with the present disclosure. Instead, they are merely examples of device and methods consistent with aspects related to the present disclosure as recited in the appended claims.

Figure 1:
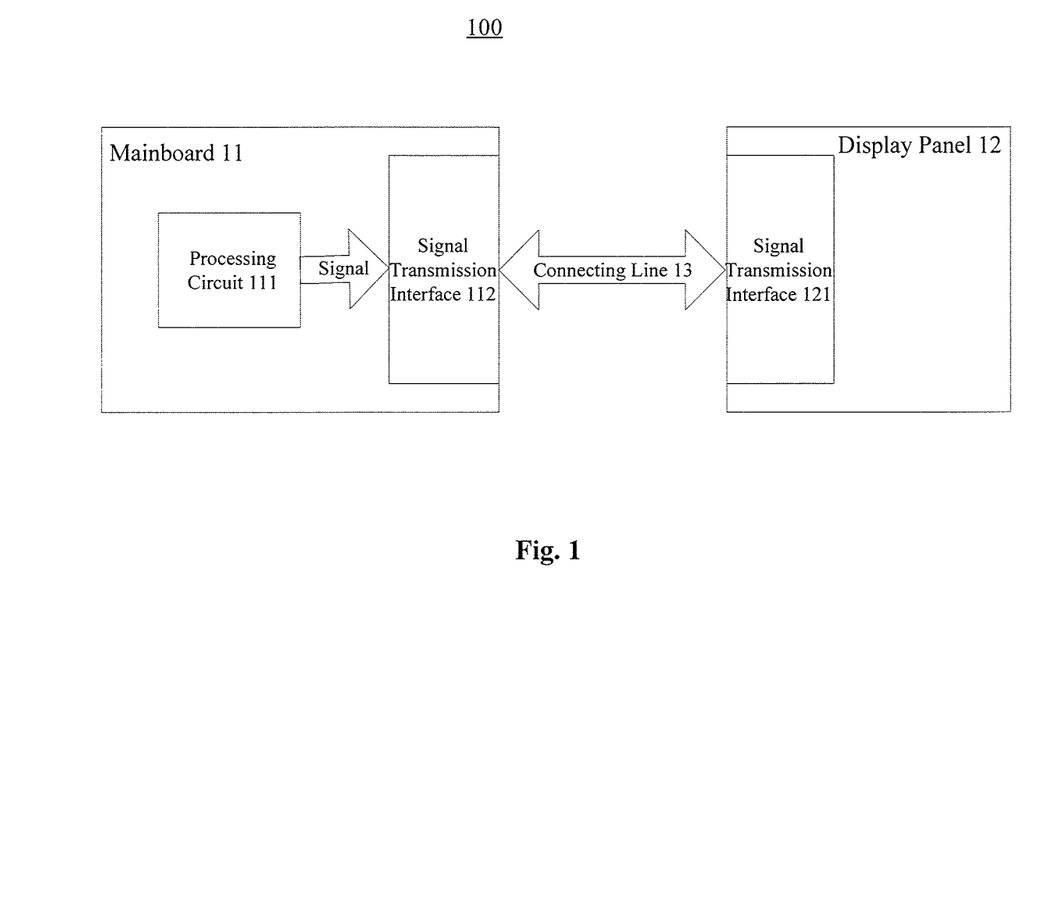
FIG. 1 is a schematic diagram of a display device, according to an exemplary embodiment.

FIG. 1 is a schematic diagram of a display device 100, according to an exemplary embodiment. As shown in FIG. 1, the display device 100 includes a mainboard 11, a display panel 12, and a connecting line 13. In the exemplary embodiment, the display device 100 has a standard connection relation between the mainboard 11 and the display panel 12.

The mainboard 11 may be a core of the display device 100 and used to implement various functions of the display device 100, such as signal processing, image processing, sound processing, etc. A structure, circuits, and components of the mainboard 11 may determine the functions implemented by the mainboard 11. The mainboard 11 includes a processing circuit 111 and a signal transmission interface 112. The processing circuit 111 may be a core processing component of the mainboard 11. For example, the processing circuit 111 may be a central processing unit ("CPU") of the mainboard 11, which may be used to implement various functions of the display device 100.

For example, the display device 100 may be a television. The processing circuit 111 of the mainboard 11 of the television may include a power adaptation circuit, a driver board, a high voltage board, and a television ("TV") board. The power adaptation circuit may be used to provide power by converting commercial power into a working voltage of the television. The driver board may be used to drive the display panel 12 to display signals. The driver board may mainly include a panel control circuit, a luminance control circuit, a DC-DC conversion circuit, a transistor-transistor logic ("TTL") level signal transmission circuit, etc. The high voltage board may be used to boost the working voltage of the television to turn on a backlight of the display panel 12. The TV board may be used to receive, demodulate, and decode a television signal.

The processing circuit 111 is electrically connected to the signal transmission interface 112 via a signal line, and transmits signals to the display panel 12 via the signal transmission interface 112. The signals transmitted to the display panel 12 by the processing circuit 111 may be classified as high-speed signals and low-speed signals based on signal frequency. For example, the high-speed signals may be video signals, including but not limited to V-by-one signals, low voltage differential signaling ("LVDS"), etc.; and the low-speed signals may be other signals than the video signals, including but not limited to power signals, control signals, state signals, etc.

The signal transmission interface 112 of the mainboard 11 is electrically connected to a signal transmission interface 121 of the display panel 12 via the connecting line 13. In some embodiments, the signal transmission interface 112 of the mainboard 11 and the signal transmission interface 121 of the display panel 12 may be timing control ("TCON") interfaces. Both of the signal transmission interfaces 112 and 121 may be connected via a standard connecting line.

Figure 2:
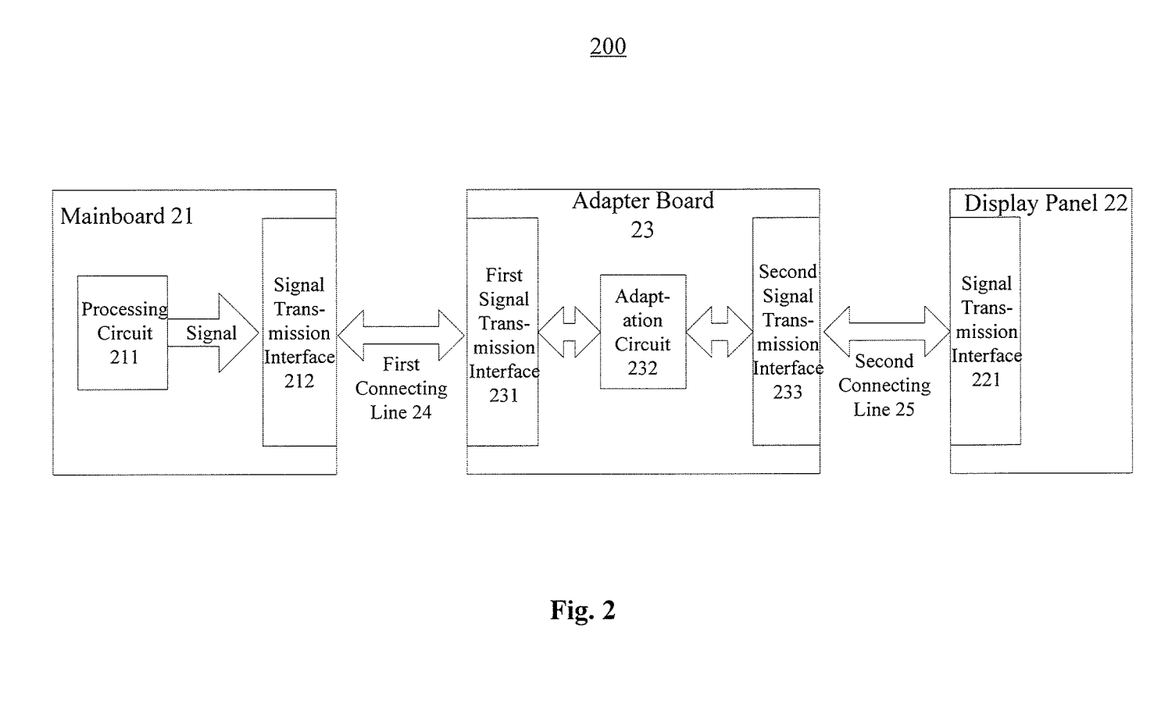
FIG. 2 is a schematic diagram of a display device, according to an exemplary embodiment.

FIG. 2 is a schematic diagram of a display device 200, according to an exemplary embodiment. Referring to FIG. 2, the display device 200 includes a mainboard 21, a display panel 22, an adapter board 23, a first connecting line 24, and a second connecting line 25.

The mainboard 21 includes a processing circuit 211 and a signal transmission interface 212. The processing circuit 211 is electrically connected to the signal transmission interface 212 via a signal line, and transmits the signal to the adapter board 23 via the signal transmission interface 212.

The adapter board 23 includes a first signal transmission interface 231, an adaptation circuit 232, and a second signal transmission interface 233. The signal transmission interface 212 of the mainboard 21 is electrically connected to the first signal transmission interface 231 of the adapter board 23 via the first connection line 24. The adaptation circuit 232 is electrically connected between the first signal transmission interface 231 and the second signal transmission interface 233. The adaptation circuit 232 may be used to convert signal properties such as line order definition, control interface, and signal level polarity, etc. For example, the mainboard 21 may support a signal with a first signal property and the display panel 22 may support a signal with a second signal property. In this case, the adaptation circuit 232 may convert the signal with the first signal property acquired from the mainboard 21 into the signal with the second signal property, and then transmit the signal with the second signal property to the display panel 22. The second signal transmission interface 233 of the adapter board 23 is electrically connected to the signal transmission interface 221 of the display panel 22 via the second connecting line 25. The signal transmission interface 212 of the mainboard 21, the first signal transmission interface 231 of the adapter board 23, the second signal transmission interface 233 of the adapter board 23, and the signal transmission interface 221 of the display panel 22 may be TCON interfaces.

In the display device 200, it may be needed to additionally provide a fixing position to fix the adapter board 23 on the display panel 22, and two groups of connecting lines may be necessary. Moreover, for high-speed signals such as video signals, when the high-speed signals transmit through the adapter board 23, impedance discontinuous points may be introduced, which may impact signal quality and reliability of signal transmission, and may even result in incorrect display. Meanwhile, an electromagnetic interference ("EMI") property may worsen.

The following embodiments may not only keep a single mainboard to adapt to various panels, but also avoid impairing signal quality of the high-speed signals. Moreover, it is not needed to provide an additional fixing position to fix an adapter board, and thus the cost may be reduced.

Figure 3A:
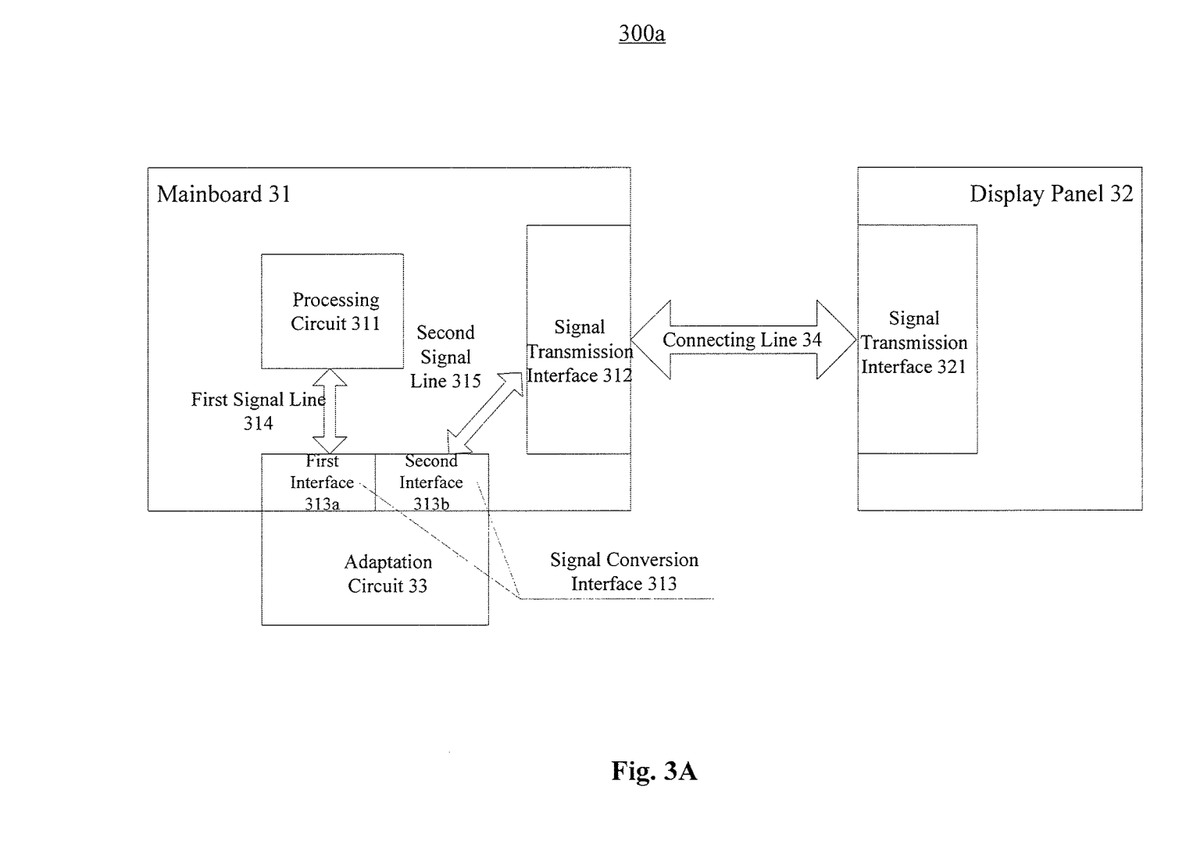
FIG. 3A is a schematic diagram of a display device, according to an exemplary embodiment.

FIG. 3A is a schematic diagram of a display device 300a, according to an exemplary embodiment. As shown in FIG. 3A, the display device 300a includes a mainboard 31, a display panel 32, an adaptation circuit 33, and a connecting line 34.

The mainboard 31 includes a processing circuit 311, a signal transmission interface 312, and a signal conversion interface 313. The signal conversion interface 313 includes a first interface 313a and a second interface 313b.

The adaptation circuit 33 is electrically connected to the signal conversion interface 313. The first interface 313a is electrically connected to the processing circuit 311 of the mainboard 31, and the second interface 313b is electrically connected to the signal transmission interface 312 of the mainboard 31.

The signal transmission interface 312 of the mainboard 31 is electrically connected to a signal transmission interface 321 of the display panel 32 via the connecting line 34.

In the present embodiment, the processing circuit 311 of the mainboard 31 is electrically connected to the first interface 313a via a first signal line 314, and the second interface 313b is electrically connected to the signal transmission interface 312 of the mainboard 31 via a second signal line 315.

In the present embodiment, by adding the signal conversion interface 313 on the mainboard 31, the adaptation circuit 33 can be electrically connected to the mainboard 31 via the signal conversion interface 313 so as to perform signal transmission with the mainboard 31. The adaptation circuit 33 may be used to convert signal properties such as line order definition, control interface, and signal level polarity, etc.

In one exemplary embodiment, the mainboard 31 supports a signal with a first signal property and the display panel 32 supports a signal with a second signal property. In this case, the process that the mainboard 31 transmits a signal to the display panel 32 may be as follows: the processing circuit 311 transmits a signal with the first signal property to the adaptation circuit 33 via the first signal line 314 and the first interface 313a; the adaptation circuit 33 converts the signal with the first signal property into a signal with the second signal property; the adaptation circuit 33 transmits the signal with the second signal property to the signal transmission interface 312 of the mainboard 31 via the second interface 313b and the second signal line 315; the signal transmission interface 312 of the mainboard 31 transmits the signal with the second signal property to the display panel 32 via the connecting line 34 and the signal transmission interface 321 of the display panel 32. The process that the display panel 32 transmits a signal to the mainboard 31 may be as follows: the display panel 32 transmits a signal with the second signal property to the signal transmission interface 312 of the mainboard 31 via the signal transmission interface 321 and the connecting line 34; the signal transmission interface 312 of the mainboard 31 transmits the signal with the second signal property to the adaptation circuit 33 via the second signal line 315 and the second interface 313*b*; the adaptation circuit 33 converts the signal with the second signal property into a signal with the first signal property; the adaptation circuit 33 transmits the signal with the first signal property to the processing circuit 311 via the first interface 313*a* and the first signal line 314.

In the display device 300*a* provided in the present embodiment, by additionally providing the signal conversion interface 313 on the mainboard 31 and making the adaptation circuit 33 be electrically connected to the signal conversion interface 313, signals to be transmitted to the display panel 32 may be converted by the adaptation circuit 33 and then transmitted to the display panel 32 via the signal transmission interface 312 of the mainboard 31; and signals received from the display panel 32 may be converted by the adaptation circuit 33 and then transmitted to the processing circuit 311 of the mainboard 31. Therefore, a single mainboard may adapt to various display panels, and meanwhile it is unnecessary to provide an additional fixing position to fix an adapter board, only a set of connecting lines may be needed to connect the mainboard 31 and the display panel 32, and thus the cost may be reduced.

It should be noted that, in the embodiments of the present disclosure, the signal conversion interface 313 may have more than one implementation. In a first implementation, the first interface 313*a* and the second interface 313*b* included in the signal conversion interface 313 may be two logically separate interfaces, and the signal conversion interface 313 may actually be a single hardware interface rather than including two different hardware interfaces. In a second implementation, the first interface 313*a* and the second interface 313*b* included in the signal conversion interface 313 may be two physically separate interfaces, i.e., the first interface 313*a* and the second interface 313*b* may be two different hardware interfaces respectively, and the signal conversion interface 313 may include the two different hardware interfaces.

Figure 3B:
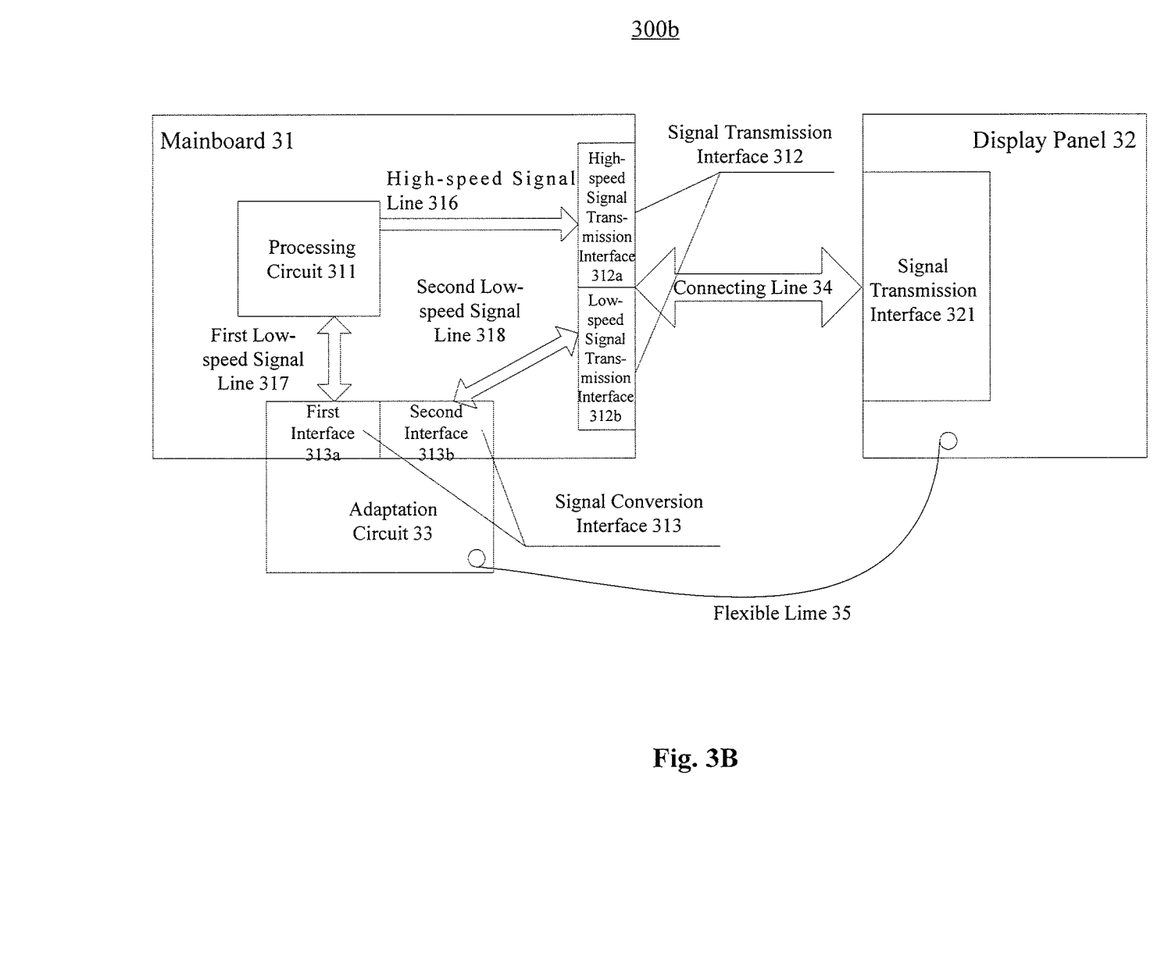
FIG. 3B is a schematic diagram of a display device, according to an exemplary embodiment.

FIG. 3B is a schematic diagram of a display device 300*b*, according to an exemplary embodiment. As shown in FIG. 3B, the display device 300*b* includes the mainboard 31, the display panel 32, the adaptation circuit 33, and the connecting line 34.

The mainboard 31 may be a core of the display device 300*b* and used to implement various functions of the display device 300*b*, such as signal processing, image processing, sound processing, etc. The structure, circuits and components of the mainboard 31 may determine the functions that may be implemented by the mainboard 31. In the present embodiment, the mainboard 31 includes the processing circuit 311, the signal transmission interface 312, and the signal conversion interface 313. The processing circuit 311 may be a core processing component of the mainboard 31. For example, the processing circuit 311 may be the CPU of the mainboard 31 and used to implement various functions of the display device 300*b*.

The signal conversion interface 313 includes the first interface 313*a* and the second interface 313*b*. The adaptation circuit 33 is electrically connected to the signal conversion interface 313. The first interface 313*a* is electrically connected to the processing circuit 311 of the mainboard 31, and the second interface 313*b* is electrically connected to the signal transmission interface 312 of the mainboard 31.

The signal transmission interface 312 of the mainboard 31 is electrically connected to the signal transmission interface 321 of the display panel 32 via the connecting line 34. In the present disclosure, types of the signal transmission interface 312 of the mainboard 31 and the signal transmission interface 321 of the display panel 32 may not be limited. Any type of signal transmission interfaces that are capable of transmitting interaction signals required between the mainboard 31 and the display panel 32 may be applicable. For example, the signal transmission interface 312 of the mainboard 31 and the signal transmission interface 321 of the display panel 32 may be TCON interfaces. Both of the signal transmission interfaces may be connected via a standard connecting line. Of course, the signal transmission interfaces 312 and 321 may also be implemented by other standardized types of interfaces, which are not limited in the present disclosure.

Different from the display device 300*a* shown in the FIG. 3A, in the display device 300*b* shown in FIG. 3B, the signal transmission interface 312 of the mainboard 31 includes a high-speed signal transmission interface 312*a* and a low-speed signal transmission interface 312*b*.

The processing circuit 311 of the mainboard 31 is electrically connected to the high-speed signal transmission interface 312*a* via a high-speed signal line 316. The processing circuit 311 of the mainboard 31 is electrically connected to the first interface 313*a* via a first low-speed signal line 317, and the second interface 313*b* is electrically connected to the low-speed signal transmission interface 312*b* via a second low-speed signal line 318.

The signals transmitted between the mainboard 31 and the display panel 32 may be classified as high-speed signals and low-speed signals based on signal frequency. For example, the high-speed signals may refer to signals whose signal frequencies are greater than a preset threshold, while the low-speed signals may refer to signals whose signal frequencies are less than the preset threshold. The high-speed signal line 316 may be used to transmit high-speed signals. The first low-speed signal line 317 and the second low-speed signal line 318 may be used to transmit low-speed signals. For example, the high-speed signals may be video signals, including but not limited to V-by-one signals, LVDS signals and the like; and the low-speed signals may be other signals than video signals, including but not limited to power signals, control signals, state signals, etc.

For a high-speed signal, the processing circuit 311 of the mainboard 31 may transmit the high-speed signal to the display panel 32 directly via the high-speed signal line 316 and the high-speed signal transmission interface 312*a*. That is, the processing circuit 311 of the mainboard 31 may transmit the high-speed signal to the high-speed signal transmission interface 312*a* of the mainboard 31 via the high-speed signal line 316, and the high-speed signal transmission interface 312*a* of the mainboard 31 may transmit the high-speed signal to the display panel 32 via the connecting line 34 and the signal transmission interface 321 of the display panel 32.

For a low-speed signal, it is assumed that the mainboard 31 supports a low-speed signal with a first signal property and the display panel 32 supports a low-speed signal with a second signal property. The process that the mainboard 31 transmits a low-speed signal to the display panel 32 may be as follows: the processing circuit 311 of the mainboard 31 transmits a low-speed signal with the first signal property to the adaptation circuit 33 via the first low-speed signal line 317 and the first interface 313*a*; the adaptation circuit 33 converts the low-speed signal with the first signal property into a low-speed signal with the second signal property; the adaptation circuit 33 transmits the low-speed signal with the second signal property to the low-speed signal transmission interface 312*b* of the mainboard 31 via the second interface 313b and the second low-speed signal line 318; the low-speed signal transmission interface 312b of the mainboard 31 transmits the low-speed signal with the second signal property to the display panel 32 via the connecting line 34 and the signal transmission interface 321 of the display panel 32. The process that the display panel 32 transmits a low-speed signal to the mainboard 31 may be as follows: the display panel 32 transmits a low-speed signal with the second signal property to the low-speed signal transmission interface 312b of the mainboard 31 via the signal transmission interface 321 and the connecting line 34; the low-speed signal transmission interface 312b of the mainboard 31 transmits the low-speed signal with the second signal property to the adaptation circuit 33 via the second low-speed signal line 318 and the second interface 313b; the adaptation circuit 33 converts the low-speed signal with the second signal property into a low-speed signal with the first signal property; the adaptation circuit 33 transmits the low-speed signal with the first signal property to the processing circuit 311 via the first interface 313a and the first low-speed signal line 317.

In some embodiments, the signal transmission interface 321 of the display panel 32 may also include a high-speed signal transmission interface and a low-speed signal transmission interface (not shown), and the transmission line 34 may accordingly include a high-speed signal transmission line and a low-speed signal transmission line (not shown). The high-speed signal transmission interface 312a of the mainboard 31 may be electrically connected to the high-speed signal transmission interface of the display panel 32 via the high-speed signal transmission line and used to transmit high-speed signals; the low-speed signal transmission interface 312b of the mainboard 31 may be electrically connected to the low-speed signal transmission interface of the display panel 32 via the low-speed signal transmission line and used to transmit low-speed signals.

In the display device 300a in FIG. 3A, the high-speed signals and the low-speed signals are not distinguished, and all the signals may be converted by the adaptation circuit 33. It is considered that signal quality of high-speed signals, such as video signals, may be impaired after being converted by the adaptation circuit 33, and pin definitions of the transmission interface of high-speed signals for various panel manufacturers are typically uniform, while pin definitions of the transmission interface of low-speed signals for various panel manufacturers are different. Thus, in the display device 300b in FIG. 3B, only the low-speed signals may be converted, while the high-speed signals may not be converted to avoid impairing their signal quality.

Still referring to FIG. 3B, in some embodiments, the adaptation circuit 33 may also include: a first predefined interface and/or a second predefined interface (not shown). The first predefined interface may be used to provide information associated with the display panel 32 to the mainboard 31. For example, the first predefined interface may be used to provide an identity ("ID") of the display panel 32 to the mainboard 31, so as to make the mainboard 31 know a type of the display panel 32 to which it currently adapts and then call a corresponding driver to perform initialization or display operations. The information (e.g., ID) associated with the display panel 32 may be preconfigured into the adaptation circuit 33. The second predefined interface may be used to provide a predefined control signal to the mainboard 31, such as additional customized control signals. The implementations of the first predefined interface and the second predefined interface may include but not be limited to: a resistance, an inter-integrated circuit ("I2C") interface and a universal asynchronous receiver and transmitter ("UART") interface. With the foregoing configuration, auxiliary signals other than common signals may be added to extend and improve the performance of the display device 300b.

In embodiments of the present disclosure, in addition to the panel ID, the information associated with the display panel 32 may also include, but not be limited to, information regarding image quality adjustment parameters, Gamma curve, etc.

In some embodiments, the adaptation circuit 33 may also include a power conversion circuit (not shown) to provide power to the adaptation circuit 33, for example, by acquiring electrical energy from the mainboard 31 and convert the electrical energy into the power suitable to the adaptation circuit 33.

Moreover, the adaptation circuit 33 may be either a small circuit board or a wire harness, or other implementations. The adaptation circuit 33 may be plugged into the signal conversion interface 313 of the mainboard 31 via a connector without the need of additional fixing equipment.

In some embodiments, the adaptation circuit 33 may be connected to the display panel 32 by a predetermined manner. In embodiments of the present disclosure, the predetermined manner may not be limited. In an exemplary embodiment, the adaptation circuit 33 may be connected to the display panel 32 via a flexible line 35. For example, this flexible line may be a rope. In another exemplary embodiment, the adaptation circuit 33 may be connected to the display panel 32 by a fixing component. For example, this fixing component may include a fastener and screws, so that an end of the fastener may be connected to the adaptation circuit 33 via a screw, while the other end of the fastener may be connected to the display panel 32 via another screw. Of course, other connection ways may also be employed between the adaptation circuit 33 and the display panel 32 to bind them together. The foregoing design may ensure that the adaptation circuit 33 can be bound to the display panel 32 after being manufactured, which may avoid an incorrect connection between the adaptation circuit 33 and the display panel 32.

The display device 300b may be a television, and may also be any electronic device with a mainboard and a display panel, such as a personal computer ("PC") display, light emitting diode ("LED") display, etc.

In the display device 300b provided in the present embodiment, by additionally providing the signal conversion interface 313 on the mainboard 31 and making the adaptation circuit 33 be electrically connected to the signal conversion interface 313, signals to be transmitted to the display panel 32 may be converted by the adaptation circuit 33 and then transmitted to the display panel 32 via the signal transmission interface 312 of the mainboard 31; and signals received from the display panel 32 may be converted by the adaptation circuit 33 and then transmitted to the processing circuit 311 of the mainboard 31. Therefore, a single mainboard may adapt to various panels, and meanwhile it is unnecessary to provide an additional fixing position to fix an adapter board, only a set of connecting lines may be needed to connect the mainboard 31 and the display panel 32, and thus the cost may be reduced.

Moreover, by dividing the signal transmission interface 312 of the mainboard 31 into the high-speed signal transmission interface 312a and the low-speed signal transmission interface 312b, the processing circuit 311 of the mainboard 31 may be electrically connected to the high-speed signal transmission interface 312a via the high-speed signal line 316, the processing circuit 311 of the mainboard 31 may be electrically connected to the first interface 313a via the first low-speed signal line 317, and the second interface 313b may be electrically connected to the low-speed signal transmission interface 312b via the second low-speed signal line 318. Thus, the high-speed signals and the low-speed signals can be processed separately. For example, only the low-speed signals are converted while the high-speed signals are not converted so as to avoid impairing the signal quality of the high-speed signals.

Moreover, by adding predefined interfaces in the adaptation circuit 33, auxiliary signals (e.g., ID of the display panel 32 or additional control signals) other than common signals may be added to extend and improve the performance of the display device 300b.

Moreover, by connecting the adaptation circuit 33 and the display panel 32 with a flexible line, the design may ensure that the adaptation circuit 33 can be bound to the display panel 32 after being manufactured.

Figure 4A:
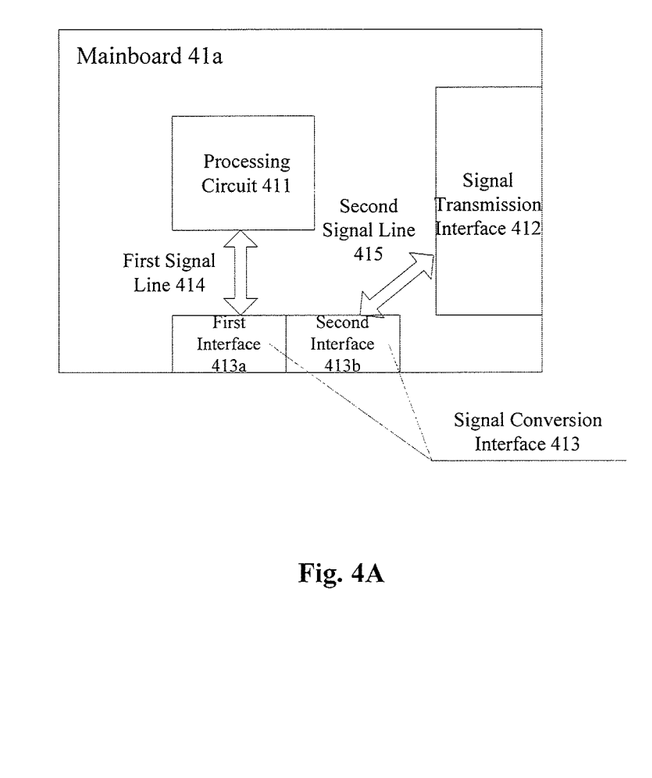
FIG. 4A is a schematic diagram of a mainboard, according to an exemplary embodiment.

FIG. 4A is a schematic diagram of a mainboard 41a applied in a display device, according to an exemplary embodiment. As shown in FIG. 4A, the mainboard 41a includes a processing circuit 411, a signal transmission interface 412, and a signal conversion interface 413. The signal conversion interface 413 includes a first interface 413a and a second interface 413b.

In an exemplary embodiment, the processing circuit 411 of the mainboard 41a is electrically connected to the first interface 413a via a first signal line 414, and the second interface 413b is electrically connected to the signal transmission interface 412 of the mainboard 41a via a second signal line 415.

Figure 4B:
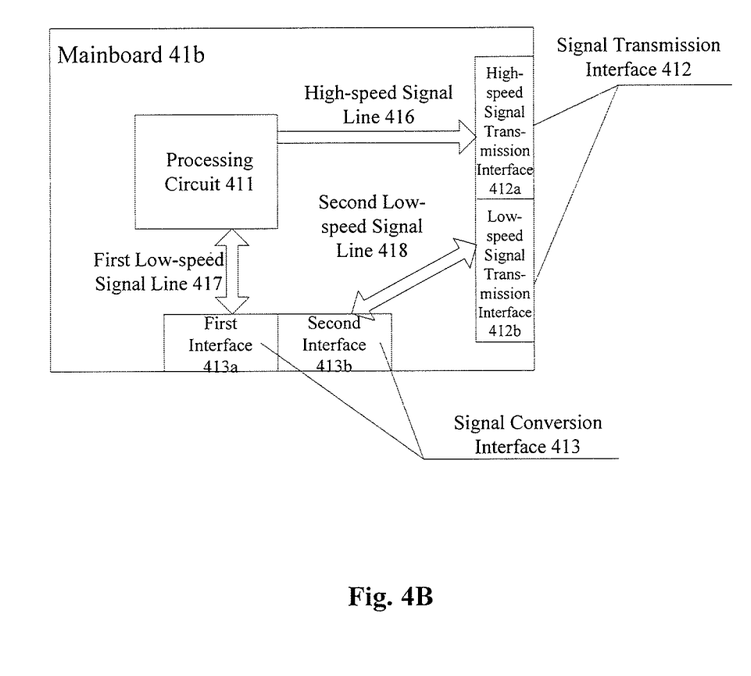
FIG. 4B is a schematic diagram of a mainboard, according to an exemplary embodiment.

FIG. 4B is a schematic diagram of a mainboard 41b applied in a display device, according to an exemplary embodiment. Different from the mainboard 41a in FIG. 4A, in the mainboard 41b in FIG. 4B, the signal transmission interface 412 of the mainboard 41b includes a high-speed signal transmission interface 412a and a low-speed signal transmission interface 412b. The processing circuit 411 of the mainboard 41b is electrically connected to the high-speed signal transmission interface 412a via a high-speed signal line 416. The processing circuit 411 of the mainboard 41b is electrically connected to the first interface 413a via a first low-speed signal line 417, and the second interface 413b is electrically connected to the low-speed signal transmission interface 412b via a second low-speed signal line 418.

In some embodiments, the high-speed signal line 416 may be used to transmit high-speed signals, and the first low-speed signal line 417 and the second low-speed signal line 418 may be used to transmit low-speed signals. For example, the high-speed signals may be video signals, and the low-speed signals may be other signals than the video signals.

In some embodiments, the signal transmission interface 412 of the mainboard 41b may be a TCON interface.

With respect to the foregoing embodiments regarding the mainboards 41a and 41b, reference can also be made to the description of the foregoing embodiments regarding the display devices 300a and 300b, which will not be repeated herein.

Other embodiments of the present disclosure will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and embodiments be considered as illustrative only, with a true scope and spirit of the disclosure being limited only by the appended claims.

It should be understood that the disclosure is not limited to the precise structure as described above and shown in the figures, but can have various modification and alternations without departing from the scope of the disclosure. The scope of the disclosure is limited only by the appended claims.

What is claimed is:

1. A display device, comprising:
   a display panel;
   a mainboard including a processing circuit, a signal transmission interface, and a signal conversion interface, wherein the signal conversion interface includes a first interface and a second interface, and the signal transmission interface is electrically connected to a signal transmission interface of the display panel; and
   an adaptation circuit electrically connected to the signal conversion interface, the first interface of the signal conversion interface being electrically connected to the processing circuit of the mainboard and the second interface of the signal conversion interface being electrically connected to the signal transmission interface of the mainboard,
   wherein:
   the processing circuit is configured to transmit a signal with a first signal property to the adaptation circuit via the first interface;
   the display panel is configured to transmit a signal with a second signal property to the adaptation circuit via the signal transmission interface of the display panel, the signal transmission interface of the mainboard and the second interface; and
   the adaptation circuit is configured to:
      convert the signal with the first signal property from the processing circuit into a signal with the second signal property to be transmitted to the display panel via the second interface, the signal transmission interface of the mainboard and the signal transmission interface of the display panel; or
      convert the signal with the second signal property from the display panel into a signal with the first signal property to be transmitted to the processing circuit via the first interface.

2. The display device of claim 1, wherein the processing circuit of the mainboard is electrically connected to the first interface of the signal conversion interface via a first signal line, and the second interface of the signal conversion interface is electrically connected to the signal transmission interface of the mainboard via a second signal line.

3. The display device of claim 1, wherein:
   the signal transmission interface of the mainboard includes a high-speed signal transmission interface and a low-speed signal transmission interface;
   the processing circuit of the mainboard is electrically connected to the high-speed signal transmission interface via a high-speed signal line; and
   the processing circuit of the mainboard is electrically connected to the first interface of the signal conversion interface via a first low-speed signal line, and the second interface of the signal conversion interface is electrically connected to the low-speed signal transmission interface via a second low-speed signal line.

4. The display device of claim 3, wherein the high-speed signal line is configured to transmit a high-speed signal, and the first low-speed signal line and the second low-speed signal line are each configured to transmit a low-speed signal.

5. The display device of claim 4, wherein the high-speed signal is a video signal, and the low-speed signal is a signal other than the video signal.

6. The display device of claim 1, wherein the adaptation circuit further includes at least one of a first predefined interface or a second predefined interface;
   the first predefined interface is configured to provide information associated with the display panel to the mainboard; and
   the second predefined interface is configured to provide a predefined control signal to the mainboard.

7. The display device of claim 1, wherein the adaptation circuit further includes a power conversion circuit.

8. The display device of claim 1, wherein the adaptation circuit is connected to the display panel by a predetermined manner.

9. The display device of claim 1, wherein the adaptation circuit is plugged into the signal conversion interface of the mainboard via a connector.

* * * * *